US006446036B1

(12) United States Patent
Bourbonnais et al.

(10) Patent No.: US 6,446,036 B1
(45) Date of Patent: Sep. 3, 2002

(54) SYSTEM AND METHOD FOR ENHANCING DOCUMENT TRANSLATABILITY

(75) Inventors: Jean Bourbonnais, Montreal; Martin Walker, Dollard-des-Ormeaux, both of (CA)

(73) Assignee: Alis Technologies, Inc., Montreal (CA)

( * ) Notice: Subject to any disclaimer, the term of this patent is extended or adjusted under 35 U.S.C. 154(b) by 0 days.

(21) Appl. No.: 09/294,028

(22) Filed: Apr. 20, 1999

(51) Int. Cl.⁷ .......................... G06F 17/28; G06F 13/00
(52) U.S. Cl. ............................................ 704/3; 709/203
(58) Field of Search .................. 704/1–8, 270, 704/277; 707/530, 536; 709/203, 316, 201, 219, 223

(56) References Cited

U.S. PATENT DOCUMENTS

| 4,595,980 A | 6/1986 | Innes ............................. 704/8 |
| 4,864,503 A | 9/1989 | Tolin ............................. 704/2 |
| 4,882,681 A | 11/1989 | Brotz ............................ 704/2 |
| 4,937,784 A | 6/1990 | Masai et al. ................. 709/104 |

(List continued on next page.)

FOREIGN PATENT DOCUMENTS

| EP | 0 867 815 A2 * | 9/1998 | ............ G06F/17/28 |
| JP | 10269223 * | 10/1998 | ............ G06F/17/28 |
| WO | WO 97/08604 | 3/1997 | ............ G06F/17/27 |
| WO | WO 98/34366 | 8/1998 | ............. H04L/1/22 |

*Primary Examiner*—Patrick N. Edouard
(74) *Attorney, Agent, or Firm*—Howrey Simon Arnold & White, LLP

(57) ABSTRACT

A teletranslation system and method for enhancing document translatability. The teletranslation system translates a document from one natural language to another. The system comprises an aggregate filter having a plurality of sections, each section performing a specific process or processes on the document in a predetermined order, each section having at least one atomic filter, and at least one MT engine for translating the processed document. The aggregate filter comprises a format conversion section, a text improvement section, a word tagging section, and a translation section. The aggregate filter analyzes the document based on a source text, format information, and a target language. The method for enhancing document translatability comprises processing the document by an aggregate filter having a plurality of sections, each of the sections processing the document in a predetermined order, each section having at least one atomic filter, and translating the processed document by a MT engine. The method further comprises changing the format of the document at a format conversion section, modifying the text at a text improvement section, tagging words at a word tagging section, and translating the document at a translation section. The method further comprises preprocessing the document at the atomic filters in a first pass, and post-processing it at the atomic filters in a second pass. The method further comprises the step of gathering specific data on the document at some atomic filters during the preprocessing step of their first pass, and using such specific data during the post-processing step of their second pass.

20 Claims, 5 Drawing Sheets

U.S. PATENT DOCUMENTS

| | | | | |
|---|---|---|---|---|
| 4,962,452 A | 10/1990 | Nogami et al. | | 704/3 |
| 4,964,030 A | 10/1990 | Suzuki et al. | | 704/6 |
| 5,005,127 A | 4/1991 | Kugimiya et al. | | 704/5 |
| 5,010,486 A | 4/1991 | Suzuki et al. | | 704/5 |
| 5,023,786 A | 6/1991 | Kugimiya et al. | | 704/4 |
| 5,077,804 A | 12/1991 | Richard | | 382/138 |
| 5,175,684 A | 12/1992 | Chong | | 704/3 |
| 5,268,839 A | 12/1993 | Kaji | | 704/2 |
| 5,270,928 A | 12/1993 | Suzuki et al. | | 704/7 |
| 5,295,068 A | 3/1994 | Nishino et al. | | 704/3 |
| 5,323,310 A | 6/1994 | Robinson | | 704/7 |
| 5,373,442 A | 12/1994 | Kutsumi et al. | | 704/3 |
| 5,396,419 A | 3/1995 | Morimoto | | 704/2 |
| 5,511,194 A | 4/1996 | Shirakata et al. | | 709/104 |
| 5,528,491 A | 6/1996 | Kuno et al. | | 704/9 |
| 5,535,120 A | 7/1996 | Chong et al. | | 704/3 |
| 5,541,837 A | 7/1996 | Fushimoto | | 704/2 |
| 5,583,761 A | 12/1996 | Chou | | 704/8 |
| 5,587,902 A | 12/1996 | Kugimiya | | 704/3 |
| RE35,464 E | 2/1997 | Suzuki et al. | | 704/4 |
| 5,636,376 A | 6/1997 | Chang | | 717/4 |
| 5,701,497 A | 12/1997 | Yamauchi et al. | | 704/3 |
| 5,712,901 A | * 1/1998 | Meermans | | 379/88 |
| 5,715,466 A | 2/1998 | Flanagan et al. | | 704/5 |
| 5,751,957 A | 5/1998 | Hiroya et al. | | 709/203 |
| 5,774,660 A | 6/1998 | Brendel et al. | | 709/201 |
| 5,774,668 A | 6/1998 | Choquier et al. | | 709/223 |
| 5,778,182 A | 7/1998 | Cathey et al. | | 709/219 |
| 5,778,228 A | 7/1998 | Wei | | 709/328 |
| 5,802,539 A | 9/1998 | Daniels et al. | | 707/542 |
| 5,826,244 A | * 10/1998 | Huberman | | 705/37 |
| 5,828,990 A | 10/1998 | Nishino et al. | | 704/2 |
| 5,862,321 A | * 1/1999 | Lamming et al. | | 709/200 |
| 5,890,138 A | * 3/1999 | Godin et al. | | 705/26 |
| 5,963,966 A | * 10/1999 | Mitchell et al. | | 707/513 |
| 5,987,508 A | * 11/1999 | Agraharam et al. | | 709/217 |
| 6,073,143 A | * 6/2000 | Nishikawa et al. | | 707/513 |

* cited by examiner

SYSTEM AND METHOD FOR ENHANCING DOCUMENT TRANSLATABILITY

BACKGROUND OF THE INVENTION

I. RELATED APPLICATION

This application is related to concurrently filed applications titled, "System and Method for Network-based Teletranslation", Ser. No. 09/294,026, filed on Apr. 20, 1999 and issued as U.S. Pat. No. 6,338,033, commonly assigned, and "System and Method for Internet-based Translation Brokerage Services", Ser. No. 09/294,027, filed on Apr. 20, 1999, commonly assigned, and incorporates the commonly assigned applications by reference in their entirety for all purposes.

II. Field of the Invention

The present invention relates generally to language translation and, more specifically, to a system and method for enhancing document translatability.

III. Description of the Related Art

Today, as more and more businesses operate across international borders, they are often required to conduct business in more than one language. Also, businesses often encounter a need for translating documents from one natural language to another natural language.

In the past, businesses have utilized human-based translation (HT) to translate documents. Although HT generally produces high quality work, it is inherently slow, labor intensive, and often expensive. Human translators are quite often specialists in a given language pair (e.g., English/French). Hence, there is a limitation on how the human translators can be allocated to different translation tasks, thus resulting in certain rigidity for a business employing the human translators.

Because HT is labor intensive, it is difficult to scale up when need increases and difficult to scale down when need decreases. The capacity of any group of translators is fairly well defined. When a sudden need arises to increase the capacity for a particular language pair, adding translators to the process creates various problems, such as harmonizing different styles, sharing glossaries and context information, and merging translated text.

The document to be translated is often submitted to the translators in different formats, for example, computer printouts, faxes, word processing files, email attachments, web pages. The translators are then left to handle the formats and extract translatable contents. While requesters of translation services prefer that the translated document be in the same format as it was originally submitted, this is often not possible, because different translators have varying technical skills and often are unable to reformat the translated document into the original format.

For these reasons, machine translation software programs, also known as machine translation engines, have been developed to provide computerized translations. Today, the term Machine Translation (MT) is widely used in the industry to refer to computerized systems that translate documents from one natural language to another, with or without human assistance. It is important to note that the term MT does not include computer-based tools that support translators by providing access to dictionaries and terminology databases, or tools that facilitate the transmission and reception of machine-readable texts, or tools that interact with word processing, text editing or printing equipment. The term MT does, however, include systems in which translators or other users assist computers in the production of translations, including combinations of text preparation, on-line interactions and subsequent revisions of machine-translated documents.

While MT engines are useful, they have several disadvantages. MT engines are typically programmed to handle documents having only certain types of formats. For example, some MT engines accept rich text format (RTF), while others accept only ASCII files. As a result, businesses often are forced to turn down translation jobs because their MT engines cannot handle a particular format or at best implement a non-trivial way of extracting the text for translation from the format information and reinserting the translated text back into the format information.

Documents sent to MT engines typically are composed of various types of information, e.g., text, graphics, diagrams, formatting information, hyperlinks, etc. All MT engines are not equal in handling text, graphics, hyperlinks, etc. Some MT engines, for instance, are not able to identify hyperlinks, while others miss formatting tags.

Furthermore, the text itself may contain information of a more circumstantial nature, for example, circumstances relating to a specific time or a place. The phrase "Les Bouches du Rhône sont ravagées par le feu" should not be translated into "The mouths of the gutter are harrowed by fire"("Les Bouches du Rhône" is the name of a small region in the south of France). Likewise, the phrase "Kohl hat alles verloren" should not be translated into "Cabbage has lost it all" (Kohl is a former German chancellor). In general, MT engines do not deal with these special problems efficiently. If a MT engine is to be programmed to handle these special problems, it will necessitate adding many new lines of code to the MT engine. It will require having access to the source code and/or the necessary programming interfaces of the MT engine. It will also require that the code be constantly updated to take into account the emergence of new cases. Adding additional code to the MT engine risks making the translation process slower. Finally, code changes and additions will be unique to each specific MT engine, requiring that the same kind of code changes and additions be made over and over, once for each specific MT engine.

For these reasons, it has been recognized that there is a need for enhancing the document translatability before submitting it to MT engines. There is a need for a system and method that allows MT engines to handle a wide variety of formats. Furthermore, there is a need for a system and method that allows MT engines to efficiently translate information of a more circumstantial nature as described before, and where the words used to express the circumstantial nature can vary widely and quickly. Furthermore, there is a need to solve these special problems with no change to the MT engines code, and in a way that is applicable to many MT engines at once.

SUMMARY OF THE INVENTION

The present invention is directed to a teletranslation system and method for enhancing document translatability. The teletranslation system translates a document from one natural language to another. In one embodiment, the system comprises an aggregate filter having a plurality of sections, each section performing a specific process or processes on the document in a predetermined order, each section having at least one atomic filter, and at least one MT engine for translating the processed document. In one embodiment, the aggregate filter comprises a format conversion section, a text improvement section, a word tagging section, and a translation section. The aggregate filter analyzes the document based on a source text, format information, and a target language.

The method for enhancing document translatability comprises processing the document by an aggregate filter having a plurality of sections, each of the sections processing the document in a predetermined order, each section having at least one atomic filter, and translating the processed document by a MT engine. The method further comprises changing the format of the document at a format conversion section, modifying the text at a text improvement section, tagging words at a word tagging section, and translating the document at a translation section. The method further comprises preprocessing the document at the atomic filters in a first pass, and post-processing it at the atomic filters in a second pass.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

Figure 1:
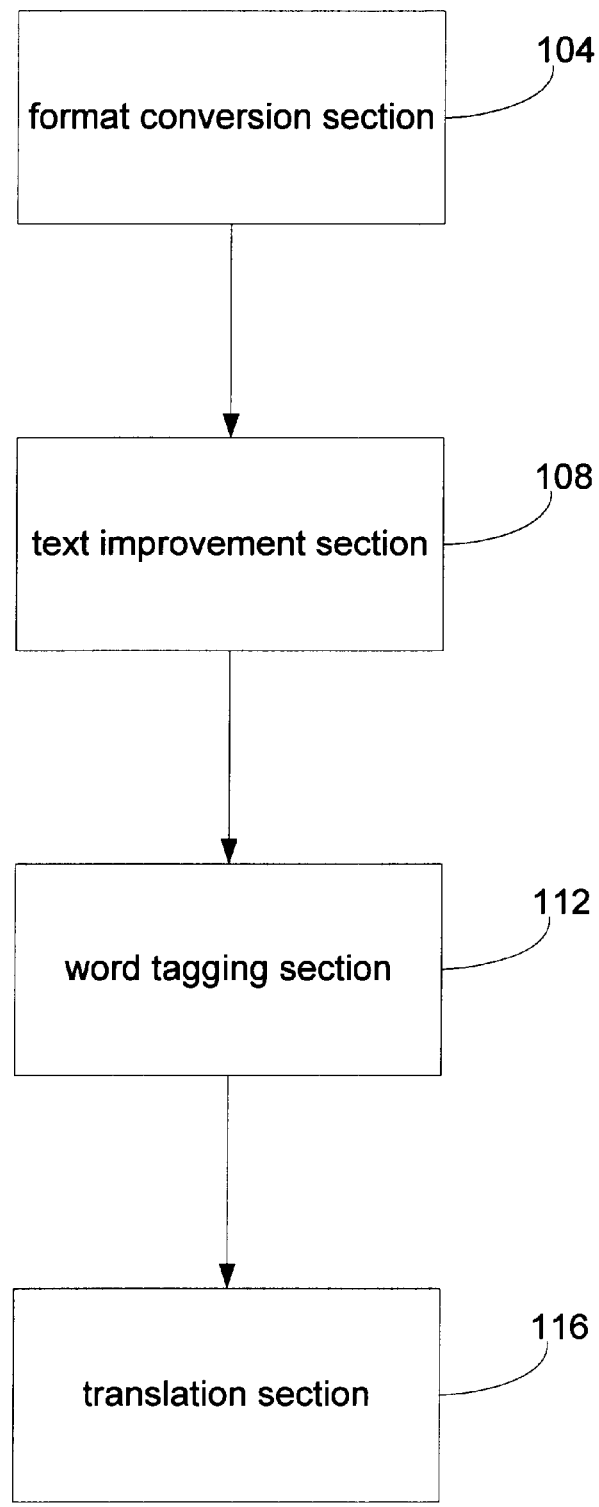
FIG. 1 illustrates an aggregate filter in accordance with one embodiment of the present invention.

The present invention is a system and method for enhancing document translatability. In one embodiment, the system receives a document, (i.e., document that needs to be translated). Depending on the content of the document, an aggregate filter calls (or assembles) an array of other filters, e.g., atomic, load-balancing or other aggregate filters, in a predetermined order.

Some of the atomic filters assembled by the aggregate filter are one-pass filters while others are two-pass filters. A one-pass filter performs a preprocessing step in a single pass. A two-pass filter performs both a preprocessing and a post-processing step. In the first pass, the atomic filters in the array preprocess the document or a part thereof in the predetermined order. The order in which each atomic filter carries out the preprocessing steps depends on the most efficient and logical way to enhance the translatability of the document. Once all preprocessing steps in the first pass are completed, the document is then translated by a MT engine. The MT engine is also a type of an atomic filter. The translated document is then further processed, if necessary, in the second pass. In the second pass, only the atomic filters having the two-pass configuration carry out additional steps, referred to as post-processing. The system finally outputs the translated document.

The preprocessing and post-processing steps enhance the quality of the translation. Without the preprocessing and post-processing steps, the MT engine would be left to deal with the special problems, such as formats, tags, code set detection, code set conversion and circumstantial nature of the document. Since MT engines are often ill equipped to handle these special problems, the translation would be of a poor quality if translated at all. The preprocessing and post-processing steps compensate for the limitations of the MT engines, thereby enhancing the quality of the translation.

As noted above, the types of filters assembled by the aggregate filter depend on the type of the translation request and on the content of the document. The aggregate filter analyzes a translation request and determines the types of filters needed to perform the particular processing steps. The aggregate filter may assemble atomic, load balancing, and even other aggregate filters. It is important to note that the atomic filter is the basic building block of all other filters. Thus, aggregate filters and load-balancing filters are all built with atomic filters.

In one embodiment, each atomic filter is programmed to perform a specific type of processing. The following examples are a few illustrations of processing by the atomic filters.

(1) The text in the document may, for example, be converted from one code set to another. For example, the code set may be converted from Shift-JIS to UTF-8.

(2) Dates may be converted from one format to another. For example, Apr. 18, 1999 may be changed to 1999-04-18.

(3) Monetary symbols may be replaced and tagged. For example, $ may be changed to "Dollars Américains" and moved after the dollar amount. Monetary amounts could also be replaced with their equivalent in a foreign currency, at a rate that could be specified. For example, "$100" could be change to "150 dollars (100 dollars Américains)".

(4) Proper names may be identified and syntactically defined. The words "Bouches du Rhône ", for example, can be identified as a single compound word and defined as a proper noun.

(5) Names of works of art, for example, paintings, movies, books, etc., may be tagged or directly translated outside the MT engines (using actual names that they were given in the target language).

(6) Names and words that are commonly used in specific regions such as names of places, people or groups, can also be tagged or directly translated. In some cases, the preprocessing also involves some post-processing (for example, change dates back to their original format).

MT engines are typically not programmed to deal with these special problems. Preprocessing and post-processing relieves the MT engines from the responsibility of handling the special problems. As a result, preprocessing and post-processing enhances the quality of the translation without changing the codes of the MT engines. Also, .the MT engines translate the document faster with increased efficiency.

Furthermore, preprocessing and post-processing outside the MT engines allows the present invention to be used with more than one type of MT engine. In other words, businesses can advantageously utilize the present invention with their existing MT engines, without having to purchase a special type of MT engine, or modify the code of any MT engine they own.

Preprocessing and post-processing results in a more uniform quality of translation from various MT engines. This is due to the fact that all MT engines are not equally efficient in dealing with special problems, such as different types of formats and the circumstantial nature of some information. Solving these special problems outside the MT engines allow all MT engines to perform with higher level of efficiency and the overall result are higher quality translations which are more consistent.

If a MT engine has to be programmed to deal with these special problems, it will require adding many new lines of codes to the MT engine. It will also require that the added code be frequently updated. This requires highly skilled personnel and is thus expensive and slow. The added code is also unique to each specific MT engine, requiring that the necessary code changes be made individually on each engine, multiplying the costs and delays involved.

In one embodiment, the translation request comprises a source text, format information, and a target language. In addition, the translation request optionally may include a list of words that should not be translated and a list of pre-translated words.

As an example, the translation request may require the following processing steps: format conversion, text improvement, and tags removal. Accordingly, the aggregate filter will assemble an array of atomic filters designed to carry out the required steps. FIG. 1 illustrates an aggregate filter 100. The aggregate filter 100 comprises four processing sections: a format conversion section 104, a text improvement section 108, a word tagging section 112, and a translation section 116.

1. Format Conversion Section

Figure 2:
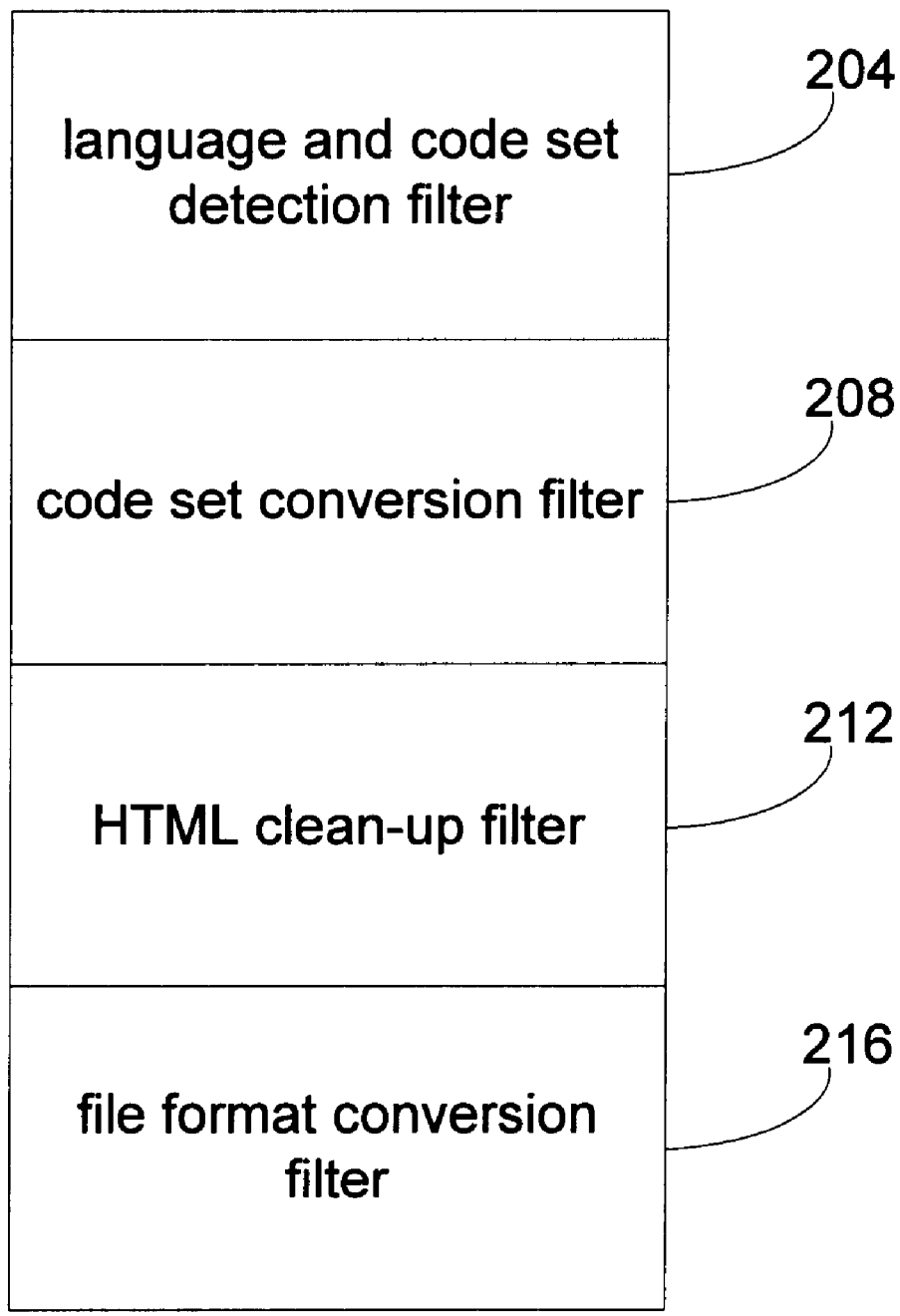
FIG. 2 illustrates a format conversion section.

The format conversion section converts formats to enhance the translatability of the document. FIG. 2 illustrates a format conversion section 200. In one embodiment, the format conversion section 200 comprises a language and code set detection filter 204, a code set conversion filter 208, a HTML clean up filter 212, and a file format conversion filter 216. These filters are further described below.

(i) Language and Code Set Detection Filter

The Language and Code Set Detection Filter detects the language and code set of the document. This filter is called upon when the language and/or code set of a document is unknown to the system. In one embodiment, the filter supports the languages and code sets listed in Table 1 below. It should be understood that the Language and Code Set Detection Filter can be configured to support other languages and code sets that are not listed in Table 1.

TABLE 1

Example of Languages and Suitable Code Sets

| Language | Abbr. | Suitable Code Sets |
| --- | --- | --- |
| Albanian | sq | cp1252; cp850; Macintosh; utf8 |
| Arabic | ar | cp1256; iso 8859-6; utf8 |
| Basque | eu | cp1252; cp850; Macintosh; utf8 |
| Bulgarian | bg | cp1251; iso 8859-5; utf8 |
| Chinese | zh | gb2312; hz; big5; utf8 |
| Croatian | sh | cp1250; iso 8859-2; Macintosh-Croat; utf8 |
| Czech | cs | cp1250 iso 8859-2; uff8 |
| Danish | da | cp1252; cp850; Macintosh; utf8 |
| Dutch | nl | cp1252; cp850; Macintosh; utf8 |
| English | en | cp1252; utf8 |
| Estonian | et | iso 8859-4; utf8 |
| Finnish | fi | cp1252; cp850; Macintosh; utf8 |
| French | fr | cp1252; cp850; Macintosh; utf8 |
| German | de | cp1252; cp850; Macintosh; utf8 |
| Greek | el | cp1253; cp869; iso 8859-7; Macintosh-Greek; utf8 |
| Hungarian | hu | cp1250; cp852; utf8 |
| Italian | it | cp1252; cp850; Macintosh; utf8 |
| Japanese | ja | euc-jp; iso 2022-jp; shift-jis; utf8 |
| Korean | ko | ks c 5601; iso 2022-kr; utf8 |
| Malay | ms | cp1252; cp850; Macintosh; utf8 |
| Norwegian | no | cp1252; cp850; Macintosh; utf8 |
| Polish | pl | cp1252; iso 8859-2; utf8 |
| Portuguese | pt | cp1252; cp850; Macintosh; utf8 |
| Russian | ru | cp1251; iso 8859-5; koi8-r; utf8 |
| Spanish | es | cp1252; cp850; Macintosh; utf8 |
| Swedish | Sv | cp1252; cp850; Macintosh; utf8 |
| Thai | Th | tis 620; utf8 |
| Turkish | Tr | cp853; iso 8859-9; utf8 |

(ii) Code Set Conversion Filter

The Code Set Conversion Filter converts a code set to another code set. Examples of the various code sets which can be used to encode a given language can be found in Table 1 above. It should be understood that the filter may be configured to support other code sets.

(iii) HTML Clean-Up Filter

The HTML Clean-Up Filter removes non-standard HTML constructs before they are processed by the system. This filter also ensures that HTML tags are not embedded inside words. If HTML tags are embedded inside words, they may be misinterpreted by MT engines and wrongly translated as part of the data. Since HTML evolves constantly, with new constructs appearing periodically, and various dialects of HTML also being used, the HTML Clean-Up Filter can also deal with novel or indigenous constructs which are not supported yet by the system.

(iv) File Format Conversion Filter

The File Format Conversion Filter converts a translation request document to and from an internal data format to preserve the original formatting of the document after translation. In one embodiment, this filter supports the following file formats: plain text; HTML; OTEXT; Microsoft Word RTF; Microsoft Word DOC; and Adobe Acrobat PDF. It will be apparent to one skilled in the art that the File Format Conversion Filter can be configured to support other file formats.

2. Text Improvement Section

Figure 3:
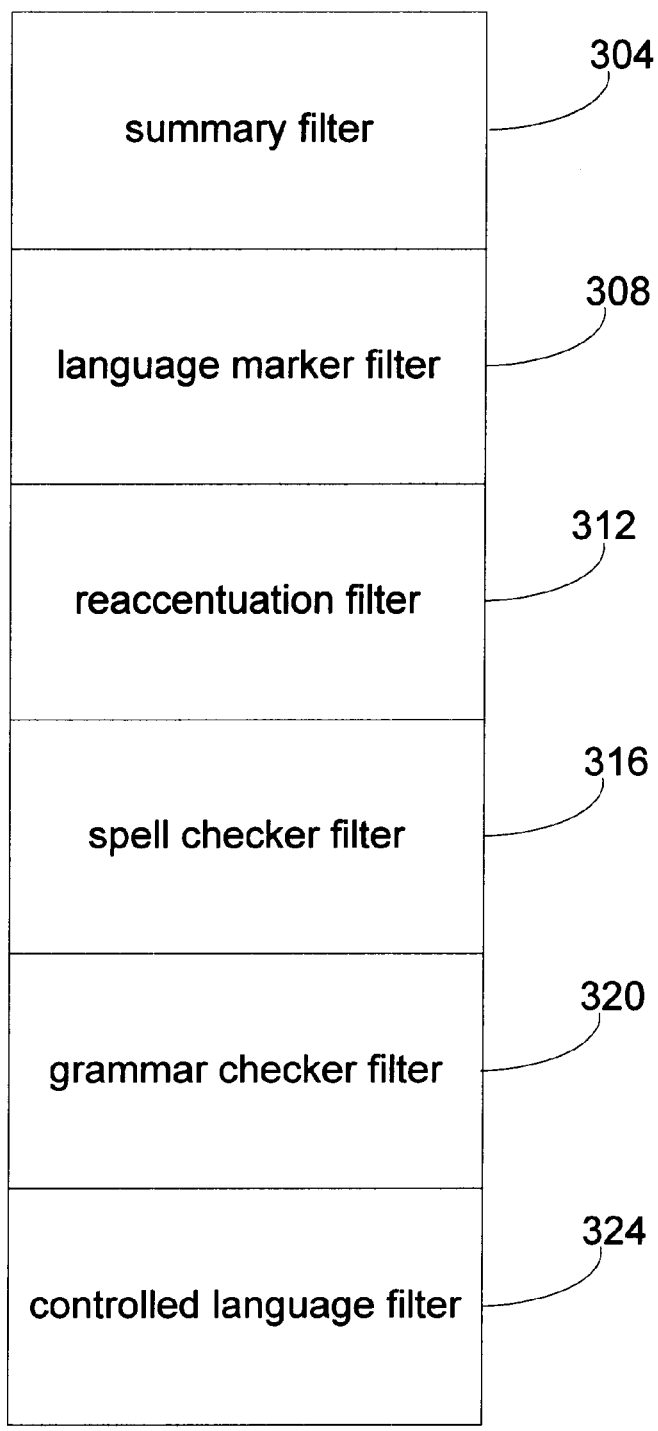
FIG. 3 illustrates a text improvement section.

The text improvement section modifies the text to enhance the quality of the translation. FIG. 3 illustrates a text improvement section 300. In one embodiment, the text improvement section comprises a language marker filter 308, a reaccentuation filter 312, a spell checker filter 316, a grammar checker filter 320, and a controlled language filter 324. These filters are further described below.

(ii) Language Marker Filter

The Language Marker Filter detects whether any part of a document is of a different language than the rest of the document. If so, this filter tags that part of the document for non-translation. In one embodiment, the tagged text can be translated using an appropriate MT engine supporting the necessary language pair.

(iii) Reaccentuation Filter

The Reaccentuation Filter provides accented characters, where appropriate, in text written in a language with accents where in fact the user has omitted the accents, for example while using an English keyboard to type French text, or where the accents have been stripped away, for example because of transmission as email on older 7-bit only email systems. This filter improves the quality of translation by ensuring that words are properly accented.

(iv) Spell Checker Filter

The Spell Checker Filter corrects misspelled words automatically where there is no ambiguity and interactively where there is, thus improving the quality of translation.

(v) Grammar Checker Filter

The Grammar Checker Filter corrects the grammar used in the text automatically where there is no ambiguity and interactively where there is. Improper grammar confuses MT engines and produces poor quality translation. This filter ensures that the grammar is correct so that the MT engines can better translate the text.

(vi) Controlled Language Filter

The Controlled Language Filter corrects the style of the text where appropriate to reduce ambiguity. This filter ensures that the text adheres to a particular language style, thus guaranteeing consistent translations.

3. Word Tagging Section

Figure 4:
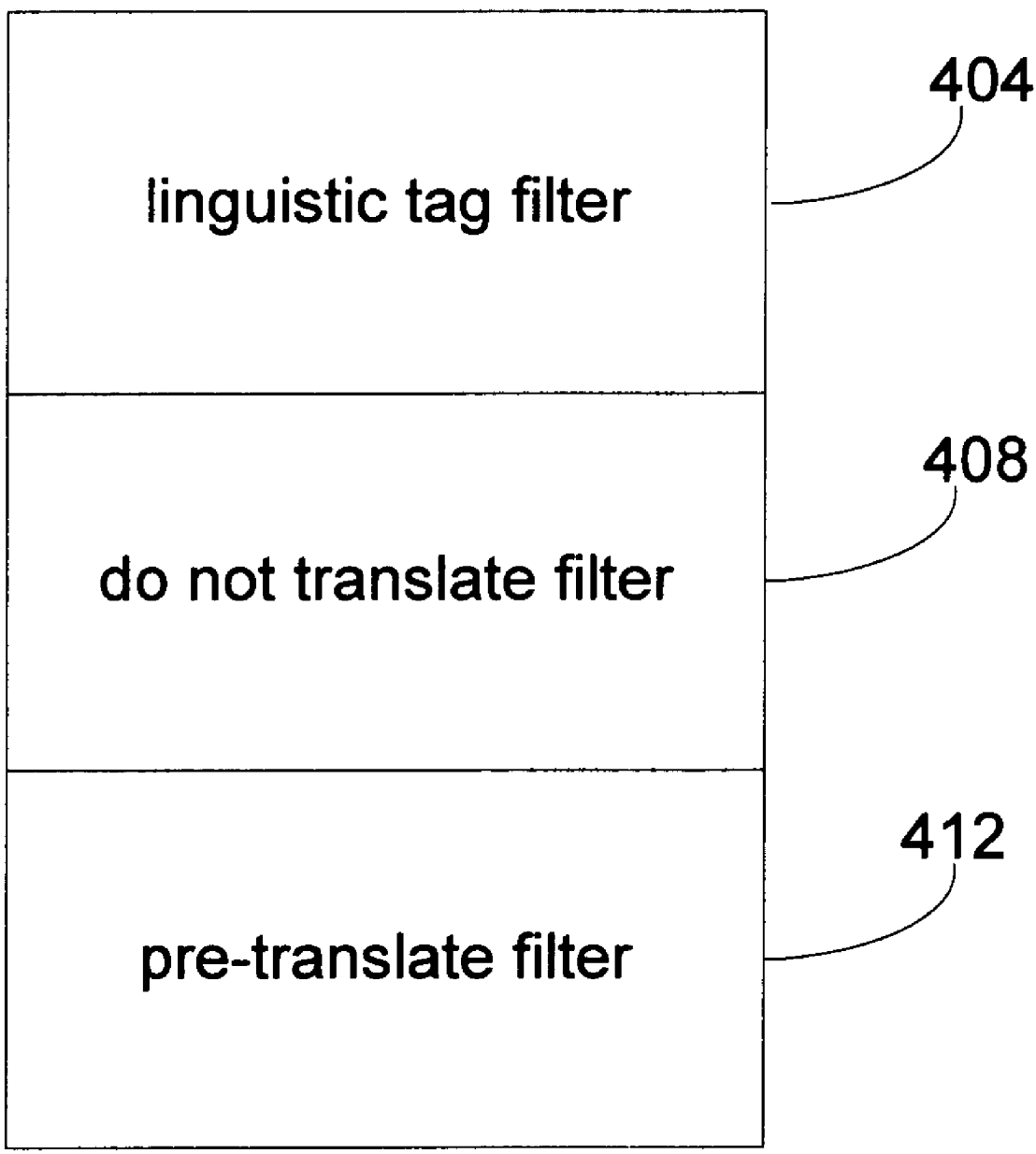
FIG. 4 illustrates a word tagging section.

The Word Tagging Section creates and uses various tags to instruct MT engines how deal with special problems. FIG. 4 illustrates a word tagging section 400 in accordance with the present invention. In one embodiment, the word tagging section 400 comprises a linguistic tag filter 404, a do not translate filter 408, and a pre-translate filter 412. These filters are further described below. It should be noted that the filters of the Word Tagging Section have the ability to use generic tags that will be accepted by any MT engine, or MT engine-specific tags that will be used only with a given MT engine in order to achieve some specific result with that MT engine, or to deal with some specific constraint or limitation of that MT engine.

(i) Linguistic Tag Filter

The Linguistic Tag Filter tags words that should not be translated by MT engines or should at least be treated differently. For example, this filter tags names of persons, geographical names, dates, and addresses.

(ii) Do Not Translate Filter

The Do Not Translate Filter tags a particular set of words, for example, proper nouns, that should not be translated. In one embodiment, this filter tags a particular set of words supplied prior to or with the translation request as not to be translated.

(iii) Pre-Translate Filter

The Pre-Translate Filter translates words in a way that is predetermined and specific to the document being processed. This filter tags words appropriately so that the MT engine will not attempt to translate these words. In one embodiment, this filter translates a particular set of words supplied prior to or with the translation request and where there is no ambiguity in the translation.

4. Translation Section

Figure 5:
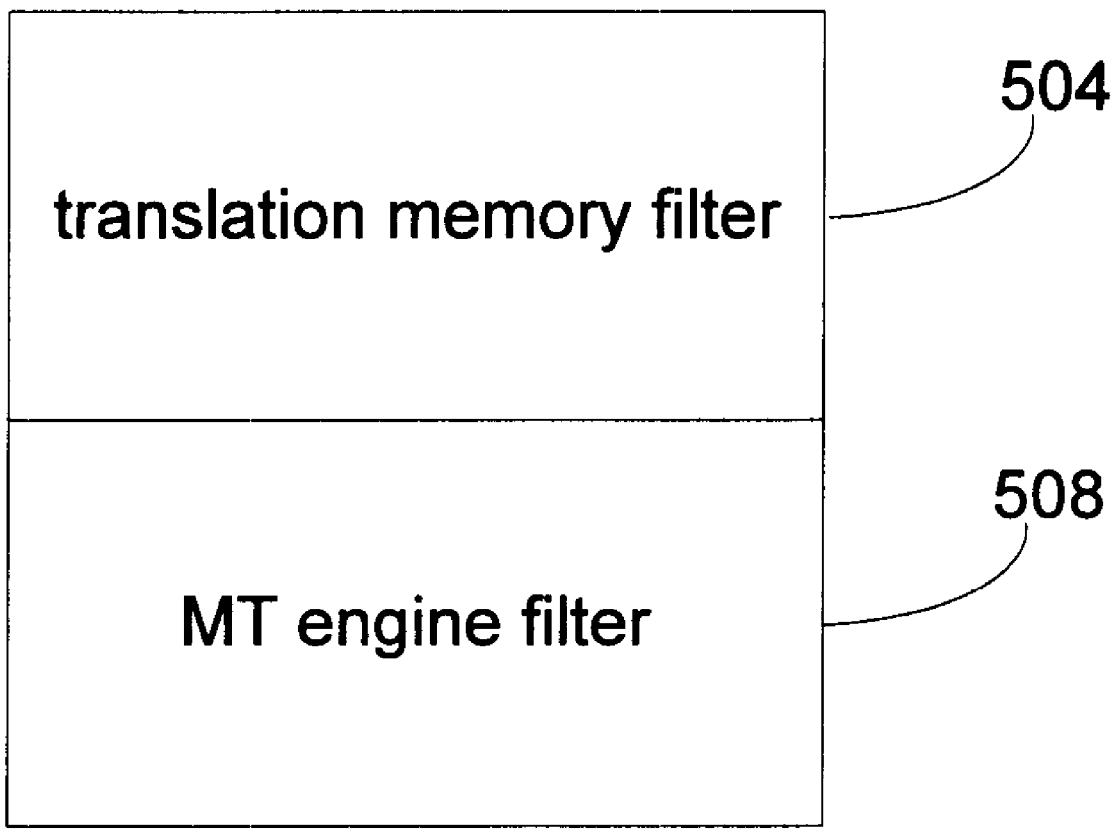
FIG. 5 illustrates a translation section.

The Translation Section takes care of performing the actual translation itself. FIG. 5 illustrates a translation section 500 in accordance with the present invention. In one embodiment, the translation stage 500 comprises a translation memory filter 504 and a MT engine filter 508.

(i) Translation Memory Filter

The Translation Memory Filter only translates parts of text for which it has an appropriate translation already in its database, and marks it as non-translatable. The translation memory alone is usually not sufficient to translate a complete document. However, in concert with the MT engine, this filter helps produce a higher quality translation.

(ii) MT Engine Filter

The MT Engine Filter corrects any idiosyncrasies that the MT engine may have (e.g., remove hyphens, insert too many spaces, etc.) and submits the text to the MT engine itself. This filter manages the list of words that the MT engine identifies as problematic or impossible to translate. This list is preserved with reference to the original document along with the data and time the request was processed.

In one embodiment, the MT Engine Filter has, for testing purposes, a configuration parameter to disable any call to the corresponding MT engine and pass the data back to a client application. In another embodiment, this filter has a configuration parameter to limit the number of concurrent requests it will accept for each language pair. When this number of concurrent requests reaches the limit, the MT engine filter sends a "server too busy" response to the caller. In one embodiment, the MT Engine Filter supports a single MT engine from a single vendor, or possibly multiple instantiation of a given MT engine from a single vendor. In another embodiment, it supports various MT engines from different vendors, or possibly multiple instantiation of various MT engines from different vendors.

It should be understood that the aggregate filter 100 can have other combinations of filters depending on the type of translation request and the content of the document. If, for example, the document does not need text improvement and does not contain any pre-translated words, then the text improvement section and the pre-translate filter are not necessary. In that case, the aggregate filter 100 will contain only the format conversion section, the word tagging section without the pre-translate filter, and the translation section. Other processing sections and filters, not described in this document, may also be created depending on the type of translation request and content of the document.

The MT engine performs the bulk of the translation. MT engines are commercially available and are manufactured by various vendors. It is important to note that the MT engines are also considered atomic filters.

According to the present invention, the atomic filters process (i.e. preprocess and/or post-process) the data in a predetermined order. The atomic filters assist the MT engines in order to enhance the quality of translation, and do so externally without requiring internal changes to the MT engines themselves. Each atomic filter performs a specific task. Many of these atomic filters and their functionality have been described above. The present invention assembles a variety of atomic filters to assist MT engines in order to provide a high quality translation. Furthermore, the present invention assembles filters selectively based on the type of specific translation request and the content of the document.

In one embodiment where the invention is implemented using software, the software may be stored in a computer program product and loaded into a computer system using a removable storage drive or a hard drive. The software may be stored in a CD-ROM, a floppy disk or any other type of storage device.

In another embodiment, the invention can be implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A teletranslation system for enhancing document translatability, the teletranslation system translating a document from one natural language to another, comprising:

an aggregate filter having a plurality of sections, each of the sections adapted to process the document, each section having at least one atomic filter, wherein the plurality of sections include a format conversion section, a text improvement section, a word tagging section, and a translation section adapted to translate a portion of the document; and a machine translation engine for translating the processed document.

2. The system as recited in claim 1, the document comprising:

source text;

format information; and target language.

3. The system as recited in claim 1, the document comprising:

a list of words that should not be translated; and a list of pretranslated words.

4. The system as recited in claim 1, wherein the aggregate filter comprises one or more aggregate filters.

5. The system as recited in claim 1, wherein the aggregate filter comprises one or more load-balancing filters.

6. The system as recited in claim 1, wherein the aggregate filter comprises a combination of one or more atomic, aggregate and load-balancing filters.

7. The system as recited in claim 1, wherein said at least one atomic filter is a one-pass filter programmed to perform a preprocessing step in a single pass.

8. The system as recited in claim 1, wherein said at least one atomic filter is a two-pass filter programmed to perform a preprocessing step and a post-processing step in a first and a second pass, respectively.

9. The system as recited in claim 8, wherein specific data is gathered by the two-pass filter during the preprocessing step in the first pass and this specific data is used during the post-processing step in the second pass.

10. The system as recited in claim 1, wherein said at least one atomic filter processes the document or a part thereof.

11. A method for enhancing document translatability of a teletranslation system translating a document from one natural language to another, comprising the steps of:

processing the document by an aggregate filter having of sections, each of the sections processing the document, each section having at least one atomic filter, wherein the plurality of sections include a format conversion section, a text improvement section, a word tagging section, and a translation section; and translating the processed document by a machine translation engine.

12. The method as recited in claim 11 further comprising the steps of:

changing the format of the document at the format conversion section;

modifying a portion of the text at the text improvement section;

tagging words at the word tagging section; and translating the document at the translation section.

13. The method as recited in claim 11, further comprising the step of preprocessing the document at said at least one atomic filter in a first pass.

14. The method as recited in claim 13, further comprising the step of post-processing the document at said at least one atomic filter in a second pass.

15. The method as recited in claim 11, further comprising the step of gathering specific data on the document at said at least one atomic filter during a preprocessing step of a first pass of said at least one atomic filter, and using the specific data during a post-processing step of a second pass of said at least one atomic filter.

16. The method as recited in claim 11, further comprising the step of processing the document or a part thereof at said at least one atomic filter.

17. A program storage device readable by a machine, tangibly embodying a program of instructions executable by the machine to perform method steps for enhancing document translatability of a teletranslation system translating a document from one natural language to another, the method comprising the steps of:

processing the document by an aggregate filter having a plurality of sections, each of the sections processing the document in a predetermined order, each section having at least one atomic filter, wherein the plurality of sections include a format conversion section, a text improvement section, a word tagging section, and a translation section adapted to translate a portion of the document; and translating the processed document by a machine translation engine.

18. The program storage device as recited in claim 17, the method for enhancing document translatability further comprising the steps of:

changing the format of the document at the format conversion section;

modifying text at the text improvement section;

tagging words at the word tagging section; and translating the document at the translation section.

19. The program storage device as recited in claim 17, the method for enhancing document translatability further comprising the step of preprocessing the document at said at least one atomic filter in a first pass.

20. The program storage device as recited in claim 19, the method for enhancing document translatability further comprising the step of post-processing the document at said at least one atomic filter in a second pass.

* * * * *